US012806551B2

(12) United States Patent
Persson

(10) Patent No.: US 12,806,551 B2
(45) Date of Patent: Nov. 24, 2026

(54) PURIFICATION OF OIL

(71) Applicant: SKF RECONDOIL AB, Stockholm (SE)

(72) Inventor: Thomas Persson, Sandviken (SE)

(73) Assignee: SKF RECONDOIL AB, Stockholm (SE)

(*) Notice: Subject to any disclaimer, the term of this patent is extended or adjusted under 35 U.S.C. 154(b) by 349 days.

(21) Appl. No.: 18/573,106

(22) PCT Filed: Jun. 29, 2021

(86) PCT No.: PCT/EP2021/067896

§ 371 (c)(1),
(2) Date: Dec. 21, 2023

(87) PCT Pub. No.: WO2023/274513

PCT Pub. Date: Jan. 5, 2023

(65) Prior Publication Data

US 2024/0286067 A1 Aug. 29, 2024

(51) Int. Cl.

*B01D 24/48* (2006.01)
*B01D 17/04* (2006.01)
(Continued)

(52) U.S. Cl.

CPC ......... *B01D 37/025* (2013.01); *B01D 17/047* (2013.01); *B01D 24/001* (2013.01);
(Continued)

(58) Field of Classification Search

CPC .. B01D 37/025; B01D 17/047; B01D 24/001; B01D 24/48; B01D 35/26;
(Continued)

(56) References Cited

U.S. PATENT DOCUMENTS 1,579,171 A 3/1926 Zoul
2,302,623 A * 11/1942 Manning ................ B01D 29/94
210/387

(Continued)

FOREIGN PATENT DOCUMENTS

DE 102012219409 A1 * 4/2014 ........... B01D 39/163
WO 2018199837 A1 11/2018

(Continued)

OTHER PUBLICATIONS

Escapenet English translation of DE102012219409a1, Apr. 24, 2014. (Year: 2014).*

(Continued)

*Primary Examiner* — Joseph W Drodge
(74) *Attorney, Agent, or Firm* — J-TEK LAW PLLC; Scott T. Wakeman; Mark A. Ussai

(57) ABSTRACT

A method for purification of contaminated oil includes at least the following two phases: a filter preparation phase which includes the steps of providing a depth filter by building at least a part of the depth filter from a filter material and impregnating at least a part of the depth filter with a separation aid; and an oil filtering phase including a step of filtering contaminated oil through the depth filter prepared during the filter preparation phase. A system is provided for performing the method of purification of contaminated oil.

13 Claims, 2 Drawing Sheets

(51) Int. Cl.
*B01D 24/00* (2006.01)
*B01D 35/26* (2006.01)
*B01D 37/02* (2006.01)

(52) U.S. Cl.
CPC ............. *B01D 24/48* (2013.01); *B01D 35/26* (2013.01); *B01D 2201/182* (2013.01)

(58) Field of Classification Search
CPC .............. B01D 2201/182; B01D 24/12; B01D 24/4631; B01D 35/12; B01D 2239/0471; B01D 2239/0478; B01D 2239/0485
See application file for complete search history.

(56) References Cited

U.S. PATENT DOCUMENTS

| | | | | | |
|---|---|---|---|---|---|
| 4,094,770 | A * | 6/1978 | Bose | C10G 21/003 | 210/729 |
| 4,156,647 | A * | 5/1979 | Nieuwenhuis | B01D 24/042 | 210/415 |
| 4,812,234 | A | 3/1989 | Perchthaler et al. | | |
| 11,458,420 | B2 * | 10/2022 | Sundström | B01D 21/30 | |
| 11,958,004 | B2 * | 4/2024 | Persson | C10M 175/0016 | |
| 2002/0060184 | A1 * | 5/2002 | Pulek | B01D 39/1607 | 210/488 |
| 2010/0072128 | A1 * | 3/2010 | Zeiler | B01D 39/18 | 210/500.22 |
| 2014/0360931 | A1 * | 12/2014 | Tinkham | B32B 5/26 | 210/490 |
| 2015/0298032 | A1 * | 10/2015 | Tinkham | B01D 29/56 | 210/489 |
| 2016/0082375 | A1 * | 3/2016 | Tinkham | B01D 39/14 | 210/493.5 |
| 2019/0224600 | A1 * | 7/2019 | Gupta | D21C 9/004 | |
| 2021/0101094 | A1 * | 4/2021 | Sundström | C10G 33/08 | |
| 2022/0016554 | A1 * | 1/2022 | Persson | B01D 37/02 | |

FOREIGN PATENT DOCUMENTS

| | | | |
|---|---|---|---|
| WO | 2018199839 | A1 | 11/2018 |
| WO | 2020162815 | A1 | 8/2020 |
| WO | 2020162816 | A1 | 8/2020 |

OTHER PUBLICATIONS

International Search Report and Written Opinion dispatched Jan. 5, 2023 in related application No. PCT/EP2021/067896.

* cited by examiner

PURIFICATION OF OIL

CROSS-REFERENCE

This application is the U.S. National Stage of International Application No. PCT/EP2021/067896 filed on Jun. 29, 2021.

TECHNICAL FIELD OF THE INVENTION

The present invention relates to a method and a system for purification of oil.

BACKGROUND OF THE INVENTION

Purification of contaminated mineral and synthetic based industrial oils, such as for example lubricating oil, honing oil, rolling oil, gear box oil, quenching oil, processing oils, hydraulic oils or pretreated slop oils is important for the possibility to use/reuse the oils and therefore an important factor for the environmental future and the limited nature resources of oils. These oils play an important role in for example lubrication, shock absorption, heat dissipation, rust prevention and extension of mechanical service life of vehicles, ships and mechanical processing equipment. During use of for example a lubricating oil an amount of pollutant particles in the oil will increase and this will increase friction and shorten equipment lifetime. The oil can be purified by different methods. Gravity settling and filtration are commonly used purification methods. However, small particles are difficult to remove. Coagulant flocculation is sometimes also used together with gravity settling for purification of oil. In some examples the contaminated oil is purified, or recovered, by means of a liquid two-phase separation process, wherein a liquid separation aid is added to the oil and mixed therewith. Impurities will be captured by the separation aid and will accumulate in a bottom phase.

In WO2018/199837 a method and system for purification of oil is disclosed where a separation aid is used and where a filtration step also is provided for purification of the oil.

Small particles are often hard to remove and gravity settling after flocculation is sometimes very slow due to a high viscosity of the oil. Efficiency in the purification may be low. For some methods, such as distillation and dehydration, energy consumption may be large.

There is a need to improve the purification process for contaminated oil.

SUMMARY

It is an object of the present invention to provide an improved method and system for the purification of oil.

This is achieved in a method, a system and a computer program product according to the independent claims.

According to one aspect of the invention a method for purification of oil is provided. Said method comprises at least two phases:

- a filter preparation phase which comprises the steps of:
  - providing a depth filter by building at least a part of the depth filter from a filter material; and
  - impregnating at least a part of said depth filter with a separation aid, and
- an oil filtering phase comprising the step of filtering contaminated oil through said depth filter which has been prepared during the filter preparation phase.

According to another aspect of the invention a system for purification of contaminated oil is provided. Said system comprises:

- a tank in which contaminated oil to be purified in the system can be provided;
- a filter device comprising a carrier layer onto which a depth filter can be built and an inlet which is fluidly connected with an outlet of the tank; and
- a filter building arrangement which is fluidly connected to the inlet and an outlet of the filter device for circulating a fluid over the filter device, wherein said filter building arrangement is configured for building at least a part of a depth filter in the filter device from a filter material by circulating a filter building oil and filter material over the carrier layer of the filter device and wherein said filter building arrangement further is configured for impregnating at least a part of said built depth filter with a separation aid by circulating said filter building oil with an added separation aid over the built depth filter.

Hereby a method and system is provided where a purification of contaminated oil is separated into two phases, a filter preparation phase and an oil filtering phase. The filter preparation phase comprises to build a depth filter from filter material and then to impregnated at least a part of said depth filter by a separation aid. After said filter preparation phase the oil filtering phase will take place whereby the contaminated oil is filtered through the prepared depth filter. Thanks to the impregnation of the depth filter with a separation aid the oil purification will be very efficient also for removal of small impurity particles. A depth filter which is impregnated with separation aid is especially effective for removal of small impurity particles because of the combined effect of the filter and the separation aid. The process comprising two separate phases will also provide for an effective method which can be automated.

According to another aspect of the invention a computer program product comprising instructions which, when executed in a processor in a control system in a system for purification of oil, cause the control system to perform the method according to the invention.

In some embodiments of the invention said oil filtering phase comprises a final step of removing at least a part of the depth filter. In such embodiments said filter preparation phase and said oil filtering phase can be repeated after each other. By removing at least a part of the depth filter, or at least a part of a filter cake of the depth filter or substantially the whole filter cake of the depth filter, and then start a new filter preparation phase a new and fresh depth filter will be provided repeatedly whereby an efficient oil purification method is provided. This method can be automated. The filter preparation phase comprising building a depth filter from a filter material and impregnating at least a part of said depth filter with a separation aid is suitable for providing in an automated system.

In one embodiment of the invention said separation aid is substantially insoluble in the contaminated oil to be purified because of its polar properties and which separation aid will by chemical interactions adsorb/absorb contaminating solids or dissolved impurities in the oil to be purified.

In one embodiment of the invention said step of providing a depth filter comprises:

- providing a filter building oil to a filter building arrangement, whereby the filter building oil can be a part of the contaminated oil or another oil;
- adding filter material to the filter building arrangement;
- mixing said filter building oil and said filter material; and circulating said mixed filter building oil and filter material over a carrier layer of a filter device until a depth filter has been built in the filter device from the added filter material, and said step of impregnating comprises two steps which may be performed simultaneously:

adding a separation aid to the filter building oil in the filter building arrangement; and circulating said filter building oil over the depth filter.

Hereby an depth filter which is impregnated with a separation aid can be efficiently provided and the method is especially suitable for being automated whereby a new filter is provided at regular or unregular intervals, wherein a length of said intervals may be dependent on one or more of for example time of filtration, amount of oil being purified, degree of contamination of oil to be purified, a measured degree of contamination of purified oil and a measured pressure drop over the depth filter.

In one embodiment of the invention said filter building arrangement comprises:

a filter material dosing device configured for adding a filter material to a filter building oil in the filter building arrangement;

a separation aid dosing device configured for adding a separation aid to a filter building oil in the filter building arrangement;

fluid connections for circulating filter building oil over the filter device; and a pump for pumping the filter building oil over the filter device.

In one embodiment of the invention said filter building arrangement further comprises:

a filter material mixing tank comprising an inlet, via which a filter building oil can be received either from the tank, if the filter building oil is the same as the contaminated oil to be purified, or from another source of filter building oil, and an outlet which is fluidly connected to the inlet of the filter device; and a recirculation fluid line which is connecting an outlet of the filter device with the inlet of the filter material mixing tank, wherein said separation aid dosing device is fluidly connected to the filter material mixing tank such that a separation aid can be dosed into the filter material mixing tank and wherein said filter material dosing device is fluidly connected to the filter material mixing tank such that a filter material can be dosed into the filter material mixing tank.

In one embodiment of the invention said system further comprises a control system which is provided in communication connection with at least:

a separation aid pump provided in the separation aid dosing device;

a filter material pump provided in the filter material dosing device;

a main pump which is provided in the system for pumping fluid over the filter device; and valves provided in the system, wherein said control system is configured for controlling said main pump, said separation aid pump, said filter material pump and said valves such that a method comprising at least two phases is provided, where the method comprises a filter preparation phase and an oil filtering phase, whereby the filter preparation phase comprises providing a depth filter by building at least a part of a depth filter from a filter material by controlling the filter material pump to pump a filter material to the filter building arrangement and by controlling the main pump to circulate the filter material together with filter building oil over the filter device and impregnating at least a part of said depth filter with separation aid by controlling the separation aid pump to pump separation aid to the filter building arrangement and controlling the main pump to circulate the separation aid over the filter device, whereby the oil filtering phase comprises controlling the main pump such that contaminated oil from the tank is pumped through the depth filter which has been built in the filter device during the filter preparation phase.

In one embodiment of the invention said system further comprises a filter removing device which is connected to the filter device and configured such that when used it can remove at least a part of a depth filter from the filter device.

In one embodiment of the invention the control system is further provided in communication connection with and configured for controlling the filter removing device, whereby the oil filtering phase further comprises a final step of controlling the filter removing device to remove at least a part of the depth filter and wherein said control system is configured for controlling said system such that said filter preparation phase and said oil filtering phase are repeated after each other.

In one embodiment of the invention said separation aid dosing device comprises a separation aid tank comprising a separation aid which is substantially insoluble in the contaminated oil to be purified because of its polar properties and which separation aid will by chemical interactions adsorb/absorb contaminating solids or dissolved impurities in the oil to be purified.

DETAILED DESCRIPTION OF EMBODIMENTS

Contaminated mineral and synthetic based industrial oils, such as for example lubricating oil, honing oil, rolling oil, gear box oil, quenching oil, processing oils, hydraulic oils or pretreated slop oils can be purified by a method and a system according to the invention. During use of for example a lubricating oil an amount of pollutant particles in the oil will increase and this will increase friction and shorten equipment lifetime. The oils can according to the invention be purified separately in a batch or continuously during use in a purification system which is connected to the equipment using the oil, i.e. integrated purification. Hereby the system according to the invention can be connected directly to an equipment using for example a lubricating oil or another industrial oil for continuous, integrated purification or the system can be positioned separately and purify contaminated oil in batches.

Figure 1:
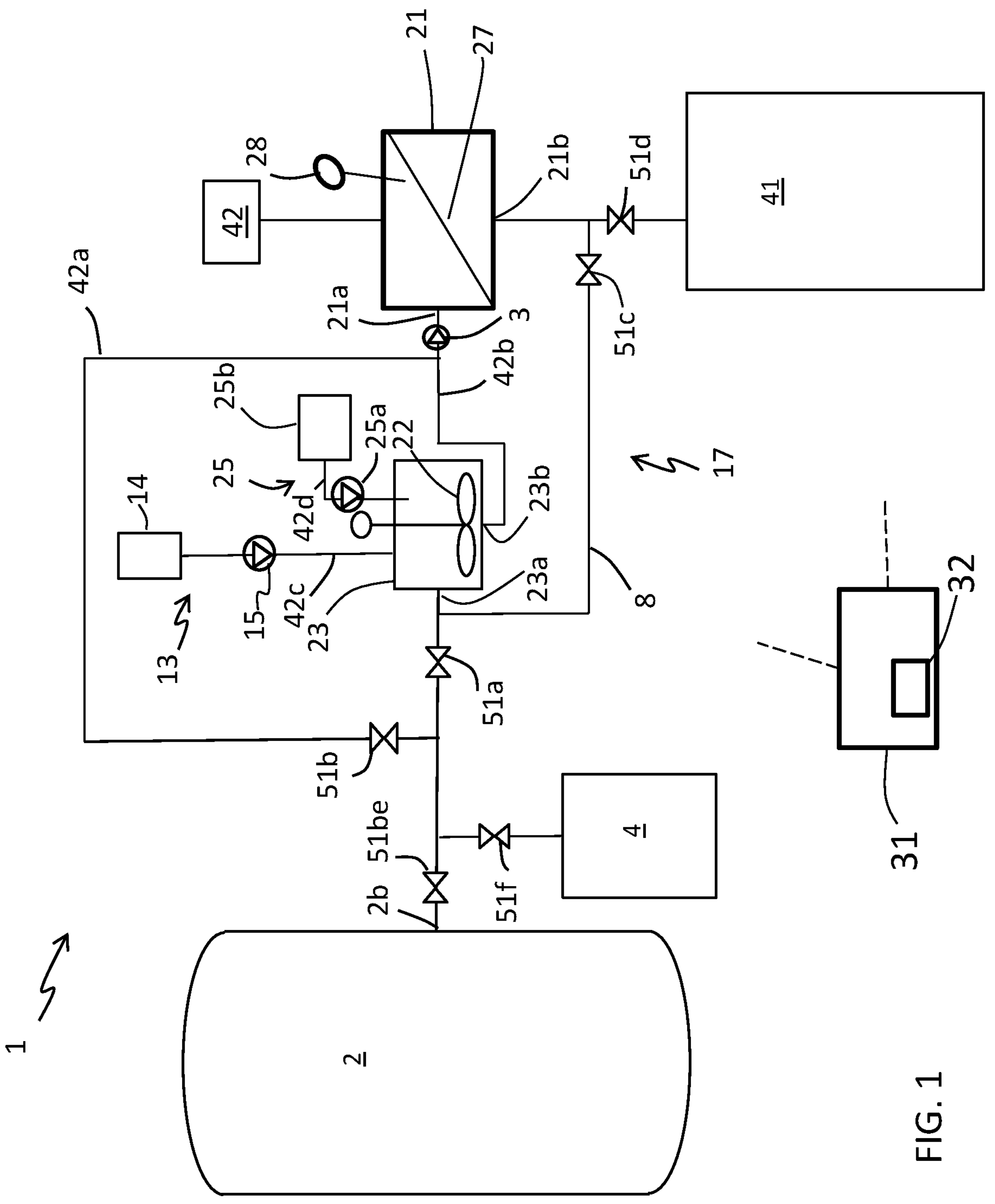
FIG. 1 shows schematically an example of a system for purification of oil according to the invention.
Figure 2:
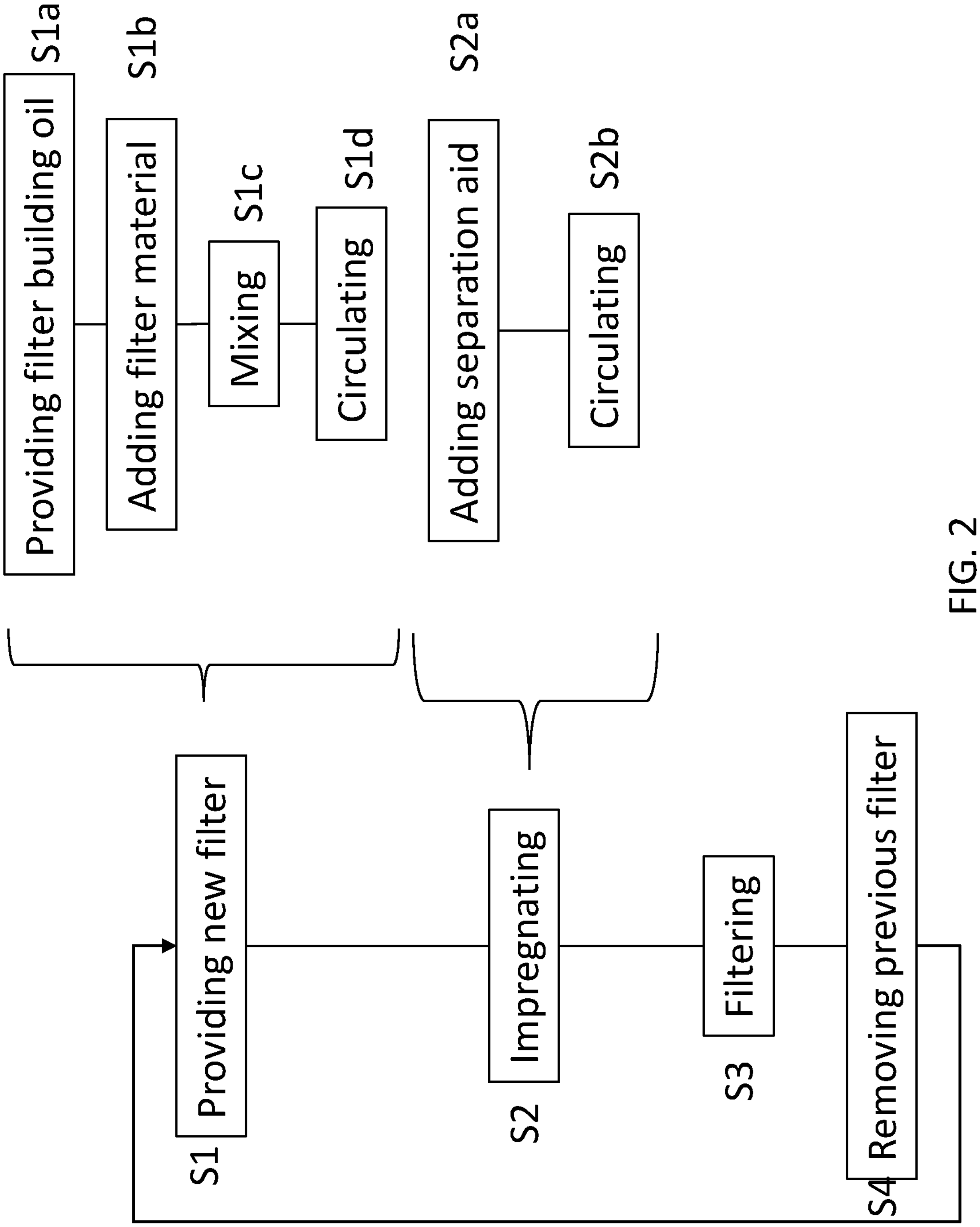
FIG. 2 is a flow chart of a method according to one example of the invention.

FIG. 1 shows schematically an example system 1 for purification of oil according to the invention. Some of the details may not be necessary for the invention. FIG. 2 is a flow chart according to one example of the invention. All the steps shown in FIG. 2 need not be provided according to the invention. The invention will first be described in general with reference to all the drawings and then a more detailed description is given.

The method according to the invention for purification of contaminated oil comprises at least two phases, which two phases are a filter preparation phase and an oil filtering phase. The filter preparation phase comprises the steps of providing a depth filter by building at least a part of the depth filter from a filter material and impregnating at least a part of said depth filter with a separation aid. Building the depth filter from a filter material comprises building a filter cake of the depth filter from the filter material, for example by circulating the filter material together with a filter building oil over a carrier layer of a filter device such that a filter cake is built on the carrier layer from the filter material. This is described in more details below. The oil filtering phase comprises the step of filtering contaminated oil through said depth filter which has been prepared during the filter preparation phase.

In some embodiments of the invention the filtering phase further comprises a final step of removing at least a part of the depth filter. Normally the whole, or substantially the whole depth filter is removed. More specifically, the filter cake or at least a part of the filter cake of the depth filter is removed at the end of the oil filtering phase. In some embodiments said filter preparation phase and said oil filtering phase are repeated after each other. Hereby the method can be repeated for effective purification of large amounts of contaminated oil. When a depth filter has been used enough, i.e., is not effective any longer due to for example clogging, the depth filter or at least a part of the depth filter or substantially the whole depth filter is removed, and a new depth filter is built and impregnated whereafter the filtering of contaminated oil can continue. The process can be made automatic and effective.

In embodiments where the method is performed automatic and where the filter preparation phase and the oil filtering phase are repeated cyclic after each other different methods can be used for deciding when the phases should alter. For example, a certain amount of contaminated oil can be filtered before a new filter preparing phase is started or a certain time can pass for each oil filtering phase. Hereby, it can be assured that a new filter is prepared and used at suitable intervals such that the purification of the oil is always efficient, and a filter is never used when it is clogged and/or too old and not efficient anymore. A sensor can also be used for monitoring the condition of the filter. For example, a pressure sensor can measure a pressure difference over the filter device which will rise when the filter is clogged. A threshold for the pressure difference over the filter device can be set whereby the oil filtering phase can be changed to the filter preparation phase when said threshold is reached. Other types of sensors can also be possible to use, such as for example a sensor which is measuring amount of particles in the filtered oil whereby a particle threshold can be set. When the sensor is measuring a particle amount over said threshold the filter is no longer efficient enough and the oil filtering phase can be automatically changed to the filter preparing phase. Hereby a continuous and automatic oil purification process is achieved by which large amounts of contaminated oil can be purified. The impregnation of the depth filter with a separation aid provides an efficient purification and allows a separation of also very small contaminating particles in the oil. Separation aid will during the impregnation step be adsorbed/absorbed by the depth filter. The separation aid and droplets of separation aid may be attached to and adsorbed/absorbed by fibers of the filter material. The filter material can be for example cellulose fibers or other types of fibrous material. The separation aid will attract contaminating particles in the contaminated oil which is filtered through the depth filter during the oil filtering phase by a liquid-liquid separation effect. Contaminated particles may comprise both particles and chemical substances, such as decomposed additives and brake-down products within the oil, such as for example varnish. No previous settling of the contaminated oil is needed, however the method according to the invention can also be used for a pre-treated oil, for example a pre-treatment with separation aid and settling is possible and/or a pre-treatment in a centrifugal separator.

The separation aid is substantially insoluble in the contaminated oil to be purified because of its polar properties and the separation aid will by chemical interactions adsorb/absorb contaminating solids or dissolved impurities in the oil to be purified. Said contaminated oil comprises in some embodiments at least one specific additive and said separation aid can be designed to be passive onto, i.e. not attracting, said at least one specific additive in the contaminated oil to be purified.

The separation aid is liquid at the temperature at which the process is carried out and will by chemical interactions adsorb/absorb contaminating solids and/or dissolved impurities in the oil to be purified. The separation aid composition is substantially insoluble in the oil to be purified because of its polar properties. The separation aid can in some embodiments have a density different from that of the oil to be purified. However, this is not necessary for this invention because the separation aid is impregnated in the depth filter.

The use of a separation aid, also called a chemical booster, for capturing contaminations/impurities in contaminated oil has been described before, see for example WO 2018/199839. In WO 2018/199839 a liquid separation aid is added to the oil and mixed therewith and impurities in the oil will be captured by the separation aid. The separation aid is substantially insoluble in the oil, forming a two-phase mixture upon mixing and the separation aid attracts impurities in the oil during mixing of oil and separation aid. The separation aid will by chemical interactions adsorb/absorb contaminating solids, and/or dissolved impurities in the contaminated target oil. In the present invention, however, the separation aid is not mixed with the contaminated oil. Instead, the contaminated oil will pass the separation aid which has been impregnated in the depth filter. The separation aid may both be attached to a surface of the depth filter and absorbed/adsorbed into fibers of the filter material. The contaminated oil will hereby pass the separation aid during filtration and a liquid-liquid separation will take place between the contaminated oil and the separation aid whereby contamination particles and dissolved impurities of the contaminated oil will be absorbed/adsorbed by the separation aid. Hereby the filtering efficiency of the depth filter is improved, and smaller sized contaminations of the oil can be separated.

The liquid separation aid for use in the invention can for example be made up based on the following components: a) a polar polymer; b) a hydrotrope/solubilizer; and, c) a co-tenside. Suitable separation aids with the properties described above, that can be used in the inventive process, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities in to the separation aid.

One example of a separation aid which can be used in this invention comprise: a) at least one polar polymer not soluble in oil and with a higher density than the oil, such as polyethylene glycol with an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric Co-surfactant, such as an propionate type e.g. Ampholak YJH-40 (Akzo Nobel) which is a sodium caprylimino dipropionate.

FIG. 2 is a flow chart of one embodiment of a method for purification of contaminated oil according to the invention. All the steps are not necessarily provided in all embodiments of the invention. The method comprises at least two phases, where one phase is a filter preparing phase and one phase is an oil filtering phase. The filter preparing phase comprises steps S1-S2 and the oil filtering phase comprises the steps S3-S4. There is also reference to FIG. 1 where a system 1 for purification of contaminated oil according to one example of the invention is shown. However, the system will be described in more detail below. The steps of the method are described in order below:

S1: Providing a new depth filter to a filter device 21 of the system 1 by building at least a part of the depth filter from a filter material. This step can be described in more details by four sub-steps, S1*a*, S1*b*, S1*c* and S1*d*:

S1*a*: Providing a filter building oil to a filter building arrangement 17, whereby the filter building oil can be a part of the contaminated oil to be purified or another oil. Both alternatives are schematically shown in FIG. 1. The filter building oil can be provided to a material mixing tank 23 of the filter building arrangement 17.

S1*b*: Adding filter material to the filter building arrangement 17. The filter material can for example be a cellulose fiber powder or another fibrous material in powder form, such as for example diatomite. The filter material can be provided to a filter material mixing tank 23 of the filter building arrangement 17 and the filter material can be provided from a filter material dosing device 25 which is fluidly connected to the filter material mixing tank 23 such that a filter material can be dosed into the filter material mixing tank 23. The amount of added filter material can be changed from time to time and adopted for different circumstances. The filter material can also be added in separate doses whereby a size of the filter cake being built up can be controlled with precision and maybe in dependence of different circumstances such as type of oil to be purified, degree of contamination of the oil to be purified etc.

S1*c*: Mixing said filter building oil and said filter material. The mixing can be performed in the filter material mixing tank 23. The filter material mixing tank 23 comprises in some embodiments a mixing device 22. Alternatively, the mixing of filter building oil and filter material need not be performed in a mixing tank but can instead be performed in for example a pump or directly in a fluid line of the filter building arrangement 17.

S1*d*: Circulating said mixed filter building oil and filter material over a carrier layer 27 of the filter device 21 until a filter cake of a depth filter has been built in the filter device 21 from the added filter material. The mixed filter building oil and filter material is circulated via a recirculation fluid line 8 which is provided in the filter building arrangement 17 of the system 1 connecting an outlet 21*b* of the filter device 21 with an inlet 23*a* of the filter material mixing tank 23. A main pump 3 is used for pumping the fluid through the filter device 21 and the recirculation fluid line 8.

S2: Impregnating at least a part of said depth filter with a separation aid as described above. The step of impregnating can be described in more details by two sub-steps, S2*a* and S2*b* which may be performed simultaneously:

S2*a*: Adding a separation aid to the filter building oil in the filter building arrangement 17, for example to the filter material mixing tank 23. When a depth filter has been built by the filter material on the carrier layer 27 of the filter device 21, the filter building oil is left in the filter material mixing tank 23 whereby separation aid is added to the filter building oil. The separation aid can be added from a separation aid dosing device 13 connected to for example the filter material mixing tank 23 of the filter building arrangement 17. However, the separation aid can as well be added to the filter building oil at another position in the filter building arrangement 17, for example directly into a fluid line or into a pump. The addition of a separation aid can be performed during the step S2*b* of circulating the filter building oil described below.

S2*b*: Circulating said filter building oil over the depth filter in the filter device 21. The filter building oil is circulated via the filter device 21 and the recirculation fluid line 8. The main pump 3 is used for pumping the fluid. During this circulation separation aid may be added to the filter building oil or alternatively separation aid is added to the filter building oil before the circulation. When the separation aid is pumped through the depth filter in the filter device 21 the separation aid will be bonded to the filter material of at least a first part of the depth filter, where a first part is a part of the depth filter which is closer to the inlet 21*a* than to the outlet 21*b*. If for example cellulose fiber powder is used as the filter material the separation aid will be bonded/absorbed efficiently to the fibers.

S3: Filtering the contaminated oil through the impregnated depth filter. Hereby the contaminated oil to be purified is pumped through the filter device 21.

S4: In this embodiment, but not necessarily for the invention, the filtering phase comprises a final step of removing at least a part of the depth filter provided in a filter device 21 of the system 1. Suitably substantially the whole filter cake of the depth filter is removed in this step. Said step of removing at least a part of a used depth filter comprises in some embodiments to force remaining oil in the depth filter out from the depth filter by compressed air before the depth filter is removed in order to minimise oil losses. The depth filter, or at least a part of the depth filter which was built from filter material during the filter building phase, is then emptied into a waste container 42. This can for example be performed by moving the carrier layer 27 of the filter device 21 such that the used filter cake is transferred into the waste container 42 and a clean carrier layer 27 is provided for the next depth filter to be built. The carrier layer 27 can for example be provided in an endless loop. In another example the carrier layer 27 comprises a metal mesh which can be opened for letting a used filter cake be moved to the waste container 42 whereby a new filter cake can be built on the now clean metal mesh which is closed again and provided in position in the filter device.

As can be seen in FIG. 2, after step S4, step S1 will take place again and so on. Hereby a filter preparation phase and an oil filtering phase will alternate. This process can be made automatic and hereby a new fresh and efficient depth filter will be provided at suitable intervals whereby filtering always will be as efficient as possible and large amounts of contaminated oil can be purified efficiently.

The example system 1 as illustrated in FIG. 1 will now be described in more details.

According to the invention a system for purification of contaminated oil is provided. Said system 1 comprises a tank 2 in which contaminated oil to be purified in the system 1 can be provided. The system 1 comprises furthermore a filter device 21 comprising a carrier layer 27 onto which a depth filter can be built. The filter device 21 has an inlet 21*a* which is fluidly connected via at least a filtering fluid line 42*a* with an outlet 2*b* of the tank 2.

The system 1 comprises furthermore a filter building arrangement 17 which is fluidly connected to the inlet 21*a* and an outlet 21*b* of the filter device 21 for circulating a fluid over the filter device 21, wherein said filter building arrangement 17 is configured for building at least a part of a depth filter in the filter device 21 from a filter material by circulating a filter building oil and filter material over the carrier layer 27 of the filter device 21 and wherein said filter building arrangement 17 further is configured for impregnating at least a part of said built depth filter with a separation aid by circulating the filter building oil with added separation aid over the built depth filter.

The filter building arrangement 17 comprises in some embodiments but not necessarily, a filter material mixing tank 23 comprising an inlet 23*a*, via which a filter building oil can be received either from the tank 2, if the filter building oil is the same as the contaminated oil to be purified, or from another source 4 of filter building oil, and an outlet 23*b* which is fluidly connected to the inlet 21*a* of the filter device 21. A filter building fluid line 42*b* is connecting the outlet 23*b* of the filter material mixing tank 23 and the inlet 21*a* of the filter device 21. A main pump 3 is provided somewhere in the system 1 for pumping fluid over the filter device 21. More pumps can also be provided in other embodiments of the invention. In the example as shown in FIG. 1 the main pump 3 is provided in the filter building fluid line 42*b* for pumping the filter building oil and filter material through the filter device 21 during the filter building phase of the method. The main pump 3 can in this embodiment also be used for pumping contaminated oil from the tank 2 through the filtering fluid line 42*a* and through the filtering device 21. However, in other examples of the invention more pumps can be provided in other positions in the system.

A filter material mixing tank 23 may not be needed in all embodiments of the invention. A mixing of the filter building oil and the filter material can instead for example be performed directly in a pump or in the fluid lines of the filter building arrangement 17. The filter material can be added in one or more doses. If a filter cake which is building up in the filter device 21 is not large enough more filter material can be added.

The filter building arrangement 17 comprises further a filter material dosing device 25 which in this embodiment is fluidly connected to the filter material mixing tank 23 such that a filter material can be dosed into the filter material mixing tank 23. The filter material dosing device 25 can comprise a filter material pump 25*a* and a filter material tank 25*b*, or alternatively a connection for allowing connection to a filter material tank, and a fluid line 42*d* which is connected to an inlet of the filter material mixing tank 23 which can be the same inlet 23*a* as where the filter building oil is received or another inlet. If no filter material mixing tank 23 is provided in the filter building arrangement 17 the filter material can be added directly into a fluid line or a pump of the filter building arrangement 17.

The filter building arrangement 17 comprises further a separation aid dosing device 13 which in this embodiment is fluidly connected to the filter material mixing tank 23 such that a separation aid can be added into the filter material mixing tank 23. The separation aid dosing device 13 can comprise a separation aid tank 14 comprising a separation aid or alternatively a connection for allowing connection to a separation aid tank 14 and a separation aid pump 15 and a separation aid fluid line 42*c* which is connected to an inlet of the filter material mixing tank 23 which can be the same inlet 23*a* as where the filter building oil is received or another inlet. However, in another embodiment of the invention the separation aid can be added to another part of the filter building arrangement 17 than the mixing tank 23, such as for example directly into a fluid line or in a pump. A mixing tank 23 need not always be provided in the filter building arrangement 17. The separation aid can be dosed into the filter building arrangement in more than one doses. The separation aid can be provided over a certain time during which time the filter building oil is circulated over the filter device 21. Hereby separation aid can effectively impregnate the depth filter of the filter device 21.

The filter building arrangement 17 comprises further a recirculation fluid line 8 which is connecting an outlet 21*b* of the filter device 21 with an inlet 23*a* of the filter material mixing tank 23. This may also be the same inlet 23*a* as where the filter building oil is received or another inlet.

The system 1 comprises suitably also a control system 31 or can be connected to a control system 31. The control system 31 is schematically shown in FIG. 1. The control system 31 is provided in communication connection, wired or wireless, with a number of pumps 3, 15, 25*a* and valves 51*a-f* in the system 1. The control system 31 is provided in communication contact with at least the separation aid pump 15 provided in the separation aid dosing device 13, the filter material pump 25*a* provided in the filter material dosing device 25 and a main pump 3 which is provided in fluid connection with the outlet 2*b* of the tank 2 and configured for pumping contaminated oil from the tank 2 and through the filter device 21. The main pump 3 may possibly also be configured for pumping contaminated oil from the tank 2 to the filter building arrangement 17 if contaminated oil is used as filter building oil and for circulating fluid from the filter building arrangement over the filter device 21 for building and impregnating the depth filter. More pumps can be provided in other embodiments according to the invention. In the example system 1 as shown in FIG. 1 a first and a second valve 51*a*, 51*b* are provided for connecting the tank 2 or the other source 4 to either the filter building arrangement 17 or directly to the filter device 21. Furthermore, a third and a fourth valve 51*c*, 51*d* are provided in the system for connecting an outlet 21*b* from the filter device either to the recirculation fluid line 8 or to a purified oil tank 41. Hereby, during the filter building phase the first and third valves 51*a*, 51*c* are provided in open states and the second and fourth valves 51*b*, 51*d* are provided in closed states and during the oil filtering phase the first and third valves 51*a*, 51*c* are provided in closed states and the second and fourth valves 51*b*, 51*d* are provided in open states. A fifth and a sixth valve 51*e*, 51*f* are in this embodiment further provided for being able to choose between the tank 2 or the other source 4 of filter building oil. However, in another embodiment such other source 4 may not be necessary. If the contaminated oil is used as filter building oil the other source 4 and the fifth and sixth valves 51*e*, 51*f* can be omitted.

The control system 31 is configured for controlling said main pump 3, said separation aid pump 15, said filter material pump 25*a* and said valves 51*a-f* such that a method comprising at least two phases is provided, where the method comprises a filter preparation phase and an oil filtering phase, whereby the filter preparation phase comprises providing a depth filter by building at least a part of a depth filter from a filter material by controlling the filter material pump 25*a* to pump a filter material to the filter building arrangement 17 (for example into the filter material mixing tank 23 according to the example as shown in FIG. 1) and by controlling the main pump 3 to circulate the filter material together with filter building oil over the filter device 21 and impregnating at least a part of said depth filter with separation aid by controlling the separation aid pump 15 to pump separation aid to the filter building arrangement 17 (for example into the filter material mixing tank 23) and controlling the main pump 3 to circulate the filter building oil with added separation aid over the filter device 21. The oil filtering phase comprises controlling the main pump 3 such that contaminated oil from the tank 2 is pumped through the depth filter which has been built in the filter device 21 during the filter preparation phase.

The system 1 according to the invention may also in some embodiments comprise a filter removing device 28 which is connected to the filter device 21 and configured such that when used it can remove at least a part of a depth filter from the filter device 21. Suitable the whole, or substantially the whole filter cake of the depth filter is removed by the filter removing device 28. The filter removing device 28 can for example comprise a pressure air device which is forcing any remaining oil in the depth filter through the depth filter before the depth filter is removed. The filter removing device 28 is furthermore configured for moving at least a part of the depth filter out from the filter device 21. In some filter devices 21 a depth filter can be removed by moving the carrier layer 27 such that the depth filter is transferred out from the filter device 21 as described in more details above. The removed depth filter can be collected in a connected container 42.

The control system 31 is further provided in communication connection with the filter removing device 28, wherein said control system 31 is configured for controlling said filter removing device 28, whereby the oil filtering phase further comprises a final step of controlling the filter removing device 28 to remove at least a part of the depth filter and wherein said control system 31 is configured for controlling said system such that said filter preparation phase and said oil filtering phase are repeated after each other.

In some embodiments of the invention said separation aid dosing device 13 comprises a separation aid tank 14 comprising a separation aid which is substantially insoluble in the contaminated oil to be purified because of its polar properties and which separation aid will by chemical interactions adsorb/absorb contaminating solids or dissolved impurities in the oil to be purified.

A computer program product is furthermore provided. Said computer program comprising instructions which, when executed in a processor 32 in the control system 31 in the system 1 for purification, cause the control system to control the flows in the system as described above. The computer program comprises at least instructions, which when executed in the processor 32 in the control system 31, cause the control system to control the system to perform the method according to the steps S1-S4 as described above.

A depth filter, also called a filter cake, is a filter which can retain impurities within a bulk structure of the filter medium in contrast to conventional thin layer surface filters which only filter at the surface. The depth filter will absorb separation aid during the impregnation step S2. During the filtering step S3, the depth filter will absorb contaminations and the separation aid absorbed in the depth filter will further help to absorb/adsorb contaminations in the oil. Hereby the efficiency of the filtering will be good and also very small contamination particles and dissolved impurities from the oil can be absorbed by the impregnated depth filter. An automation of the process can easily be achieved, both for the building up of the filter cake and for the changing of the filter. Furthermore, if for example a cellulose fiber powder is used for the building of a filter cake, the size, i.e. the depth of the depth filter can very easily be changed from case to case by just adopting an amount of added cellulose fiber powder. Hereby a very flexible and effective oil purification method and system is provided. In one embodiment of the invention the depth filter 21 can be built up by circulating a mix of cellulose fiber powder and a filter building oil over a carrier paper 27 and possibly adding more cellulose fiber powder during circulation until a filter cake of the depth filter 21 is large enough for filtering the contaminated oil.

An advantage with depth filtering is a high dirt holding capacity without clogging due to greater total filter mass. Using cellulose fiber powder as filter medium enables absorption of both polar liquid separation aid and water together with solid particles. By decreasing the filtering rate, the contact time will increase giving a high separation efficiency.

A depth filter will be very effective for filtering out very small particles, here called micro and nano sized particles which are in the size of μm or smaller. When reusing an industrial oil over and over again it will become more and more important to also be able to get rid of the smallest particles when purifying the oil for the reuse. Otherwise, the amount of the smallest particles will grow, and they will become an increasing problem in the oil the more times the oil has been purified for reuse. The combination of the separation aid as used in the present invention for the purification of the oil and the use of a depth filter is especially effective for the removal of the smallest contamination particles in the oil.

Even the smallest micro and nano sized particles will to a high degree be filtered by the method according to the invention.

This type of depth filter using a filter material, for example in the form of cellulose fiber powder for building a depth filter is a very cost-efficient type of filtering. Furthermore, it is a very flexible filtering method because the thickness of the filter can be easily adapted from time to time by changing amount of cellulose fiber powder to add for building the filter.

The invention claimed is:

1. A method for purification of contaminated oil, the method comprising at least the following two phases:

a filter preparation phase which includes the steps of:

providing a depth filter by building at least a part of the depth filter from a filter material mixed into a liquid filter building oil; and impregnating the at least a part of the depth filter with a separation aid, and an oil filtering phase including the step of filtering contaminated oil through the depth filter prepared during the filter preparation phase, the contaminated oil being unmixed with the separation aid before entering the depth filter.

2. The method according to claim 1, wherein the oil filtering phase further includes a final step of removing at least a part of the depth filter from a filter device.

3. The method according to claim 2, wherein the filter preparation phase and the oil filtering phase are repeated at least once.

4. The method according to claim 1, wherein the separation aid is substantially insoluble in the contaminated oil and is configured to adsorb and/or absorb contaminating solids and/or dissolved impurities in the contaminated oil.

5. The method according to claim 4, wherein at least one of: the separation aid has polar properties which render the separation aid is substantially insoluble in the contaminated oil; and the separation aid adsorbs and/or absorbs the contaminating solids and/or dissolved impurities by chemical interactions.

6. The method according to claim 1, wherein the step of providing a depth filter includes:

providing the filter building oil to a filter building arrangement, the filter building oil being a part of the contaminated oil or another oil;

adding filter material to the filter building arrangement;

mixing the filter building oil and the filter material; and circulating the mixed filter building oil and filter material over a carrier layer of a filter device until a depth filter is formed in the filter device from the added filter material, and wherein the step of impregnating includes two substeps performed simultaneously or sequentially:

adding the separation aid to the filter building oil in the filter building arrangement; and circulating the filter building oil over the depth filter.

7. A system for purification of contaminated oil, the contaminated oil being unmixed with separation aid, the system comprising:

a tank for containing contaminated oil to be purified and having an outlet;

a filter device including a carrier layer onto which a depth filter can be built, an inlet fluidly connected with the outlet of the tank and an outlet;

a filter building arrangement fluidly connected to both of the inlet and the outlet of the filter device and configured to circulate a fluid over the filter device and;

a filter moving device connected to the filter device and configured to remove at least a part of the depth filter from the filter device, wherein the filter building arrangement is configured for building at least a part of the depth filter in the filter device from a filter material by circulating a filter building oil and filter material over the carrier layer of the filter device, wherein the filter building arrangement is further configured for impregnating at least a part of the built depth filter with a separation aid by circulating filter building oil with an added separation aid over the built depth filter; and wherein contaminated oil flows from the tank and into the filter device so as to be unmixed with separation aid before entering the depth filter.

8. The system according to claim 7, wherein the filter building arrangement further includes:

a filter material dosing device configured for adding a filter material to the filter building oil in the filter building arrangement;

a separation aid dosing device configured for adding the separation aid to the filter building oil in the filter building arrangement;

fluid connections for circulating the filter building oil over the filter device; and a pump for pumping the filter building oil over the filter device.

9. The system according to claim 8, wherein the filter building arrangement further includes:

a filter material mixing tank having an inlet for receiving the filter building oil from the tank of contaminated oil or from a source of filter building oil, and an outlet fluidly connected to the inlet of the filter device; and a recirculation fluid line connecting the outlet of the filter device with the inlet of the filter material mixing tank, wherein the separation aid dosing device is fluidly connected to the filter material mixing tank such that the separation aid can be dosed into the filter material mixing tank, and wherein the filter material dosing device is fluidly connected to the filter material mixing tank such that the filter material can be dosed into the filter material mixing tank.

10. The system according to claim 8, further comprising a control system provided in communication connection with at least:

a separation aid pump provided in the separation aid dosing device;

a filter material pump provided in the filter material dosing device;

a main pump provided in the system for pumping fluid over the filter device; and valves provided in the system, wherein the control system is configured for controlling the main pump, the separation aid pump, the filter material pump and the valves such that a method including at least two phases is provided, the method including a filter preparation phase and an oil filtering phase, the filter preparation phase including providing a depth filter by building at least a part of a depth filter from a filter material by controlling the filter material pump to pump a filter material to the filter building arrangement and by controlling the main pump to circulate the filter material together with filter building oil over the filter device and impregnating at least a part of the depth filter with separation aid by controlling the separation aid pump to pump separation aid to the filter building arrangement and controlling the main pump to circulate the separation aid over the filter device, the oil filtering phase including controlling the main pump such that contaminated oil from the tank is pumped through the depth filter which has been built in the filter device during the filter preparation phase.

11. The system according to claim 10, further comprising a filter removing device connected to the filter device and configured to remove at least a part of the depth filter from the filter device and wherein the control system is communicatively connected with and configured for controlling the filter removing device, the oil filtering phase further including a final step of controlling the filter removing device to remove the at least a part of the depth filter and wherein the control system is configured for controlling the system such that the filter preparation phase and the oil filtering phase are repeated at least once.

12. The system according to claim 8, wherein the separation aid dosing device includes a separation aid tank containing the separation aid substantially insoluble in the contaminated oil and configured to adsorb and/or absorb contaminating solids and/or dissolved impurities in the contaminated oil.

13. The system according to claim 12, wherein at least one of: the separation aid has polar properties such that the separation aid is substantially insoluble in the contaminated oil; and the separation aid is configured to adsorb and/or absorb contaminating solids and/or dissolved impurities in the contaminated oil by chemical interactions.

* * * * *